Oct. 15, 1968     W. J. ZENNER     3,406,253

MAGNETO-MECHANICAL TRANSMITTER DISTRIBUTOR

Filed Jan. 4, 1965     2 Sheets-Sheet 1

INVENTOR
WALTER J. ZENNER

BY *E. J. Kane*

ATTORNEY

Oct. 15, 1968       W. J. ZENNER       3,406,253
MAGNETO-MECHANICAL TRANSMITTER DISTRIBUTOR
Filed Jan. 4, 1965       2 Sheets-Sheet 2
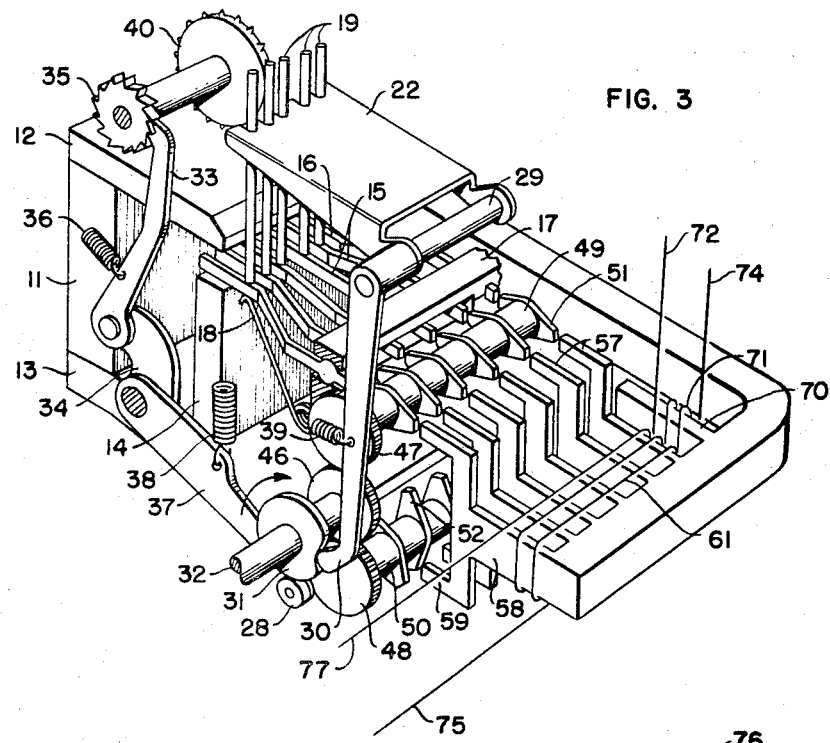
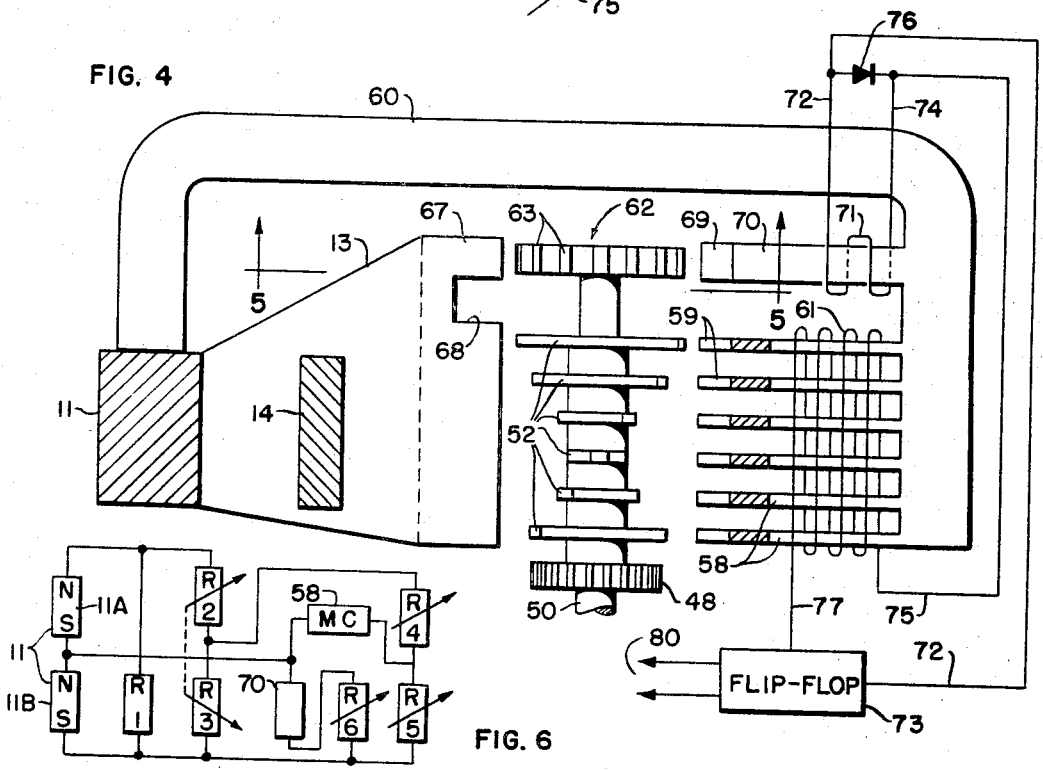

United States Patent Office 3,406,253
Patented Oct. 15, 1968

3,406,253
MAGNETO-MECHANICAL TRANSMITTER
DISTRIBUTOR
Walter J. Zenner, Des Plaines, Ill., assignor to Teletype
Corporation, Skokie, Ill., a corporation of Delaware
Filed Jan. 4, 1965, Ser. No. 423,238
12 Claims. (Cl. 178—17)

ABSTRACT OF THE DISCLOSURE

A device for sensing permutation-coded apertures in a telegraph tape and causing a series of time related marking and spacing signals representative of the aperture permutations to be provided in a transmitting conductor. A magnetic control device causes a memory core to be driven from a first stable state to a second stable state when an aperture is sensed and subsequently causes the memory core to be driven back to the first stable state. Output pulses are induced in a conductor wound in common around all of the memory cores when the memory cores are driven from the first stable state to the second stable state. The output pulses control operation of a bistable flip-flop which causes a series of time related output pulses to be provided in the transmitting conductor.

It is an object of the present invention to provide a tape controlled transmitter distributor having a minimum of mechanical parts.

Another object of the invention is to provide a tape controlled transmitter-distributor in which both the sensing and distribution of code combinations are accomplished by translating the mechanical movements of sensing pins directly into magnetic flux changes to control signal transmission.

In accordance with one embodiment of the invention a tape reader-transmitter is provided for effecting transmission of telegraph signals utilizing a series of sensing pins for detecting the presence or absence of perforations in tape. The sensing pins control a set of arms individual to them which serve as magnetic paths for completing a magnetic circuit from one or the other of two pole pieces of a permanent magnet through setting rotors which, once in each cycle of the apparatus, close a gap between an end of each of the arms and an associated pole face on a series of memory cores. There is one memory core provided for each level of the tape and an additional one provided for generating the start pulse of a series of pulses in a start-stop code combination. A magnetic structure is provided wherein the permanent magnet has pole faces associated with the movable arms and a third pole face associated with a plurality of restoring rotors which are equal in number to the number of setting rotors and sequentially close the magnetic gap between the third pole piece of the permanent magnet and a second pole face on each of the core members. A magnetic return member is provided which extends from the midpoint of the permanent magnet to the end of the memory cores opposite their previously mentioned pole faces. The memory cores have a signal winding common to them for controlling a flip-flop circuit in conjunction with a pulsing circuit including an auxiliary rotor driven with the restoring rotors to pulse an auxiliary winding, which through a diode serves to control the operation of the flip-flop.

The action of the setting rotors under control of the sensing pin actuated arms will cause selected ones of the memory cores to be driven from a primary stable state to a secondary stable state when an aperture is sensed in the tape and the restoring rotors will cause the memory cores to be driven back to the primary stable state thus to induce output pulses in the signal winding on the memory cores when the memory cores have been driven from one stable state to the other stable state.

A more complete understanding of the invention may be had from the following detailed description when considered in conjunction with the accompanying drawings wherein:

FIG. 3 is a fragmentary perspective view of the apparatus shown in elevation in FIG. 1, more clearly to illustrate the relative location of the various parts of the apparatus;

FIG. 4 is a plan sectional view, taken substantially along the line 4—4 of FIG. 1 in the direction of the arrows, showing the relationship of the restoring rotors and the lower pole pieces of the permanent magnet and the respective memory cores;

FIG. 6 is a schematic magnetic circuit of one level of the apparatus.

Figure 1:
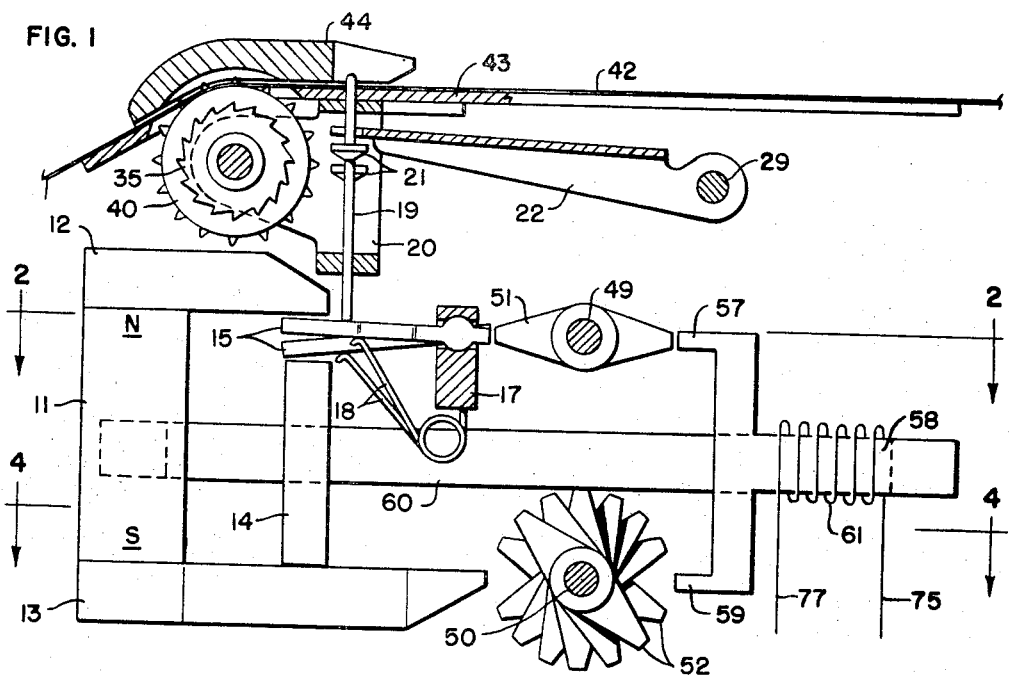
FIG. 1 is a front elevational view, partly in section, of an apparatus embodying the features of the invention, structural supporting and connecting parts having been eliminated for clarity of disclosure.

By reference to the drawings, wherein like reference numerals designate the same parts throughout the several views, it will be seen that a permanent magnet 11 is provided which has a pair of pole pieces 12 and 13. The upper pole piece 12 is somewhat shorter than the lower pole piece 13 and a secondary pole piece 14 extends upwardly from the lower pole piece 13 into proximity with the right end of the upper pole piece 12 to provide a magnetic gap between the lower and upper poles of the magnet into which there extends a plurality of five movable arms 15 and a stationary arm 16. The movable arms 15 are pivoted for movement in a non-magnetic pivot bearing 17 and are urged upwardly by coil springs 18 individual to them. Each of the movable arms 15 has associated with it a sensing pin 19. The sensing pins 19 are freely slidable in a stationary guide 20 and in their retracted position hold the movable arms 15 in a downward or counterclockwise position. Intermediate its ends, each of the sensing pins 19 is provided with a collar 21 that is fixed to it and in the inoperative condition of the apparatus the pins 19 are held in a downward position by a bail 22 that is suitably notched to receive the shanks of the sensing pins 19 and to engage the collars 21.

The bail 22 is oscillatable about a pivot shaft 29 and has fixed to it a cam lever 30 (shown in FIG. 3), the lower end of which engages the surface of a cam 31 that is mounted on a main power shaft 32. The main power shaft 32 is continuously driven by any suitable power device and in addition to serving to actuate the bail 22 also actuates a feed pawl 33 that is pivotally mounted on the end of a crank lever 34 and is held in engagement with a feed ratchet 35 by a contractile spring 36. The crank lever 34 is attached to a cam lever 37 carrying a cam roller 28 that rides the surface of the cam 31. The cam levers 37 and 30 are driven by springs 38 and 39, respectively, that tend to force the cam levers 37 and 30 to move the cam roller 28 and lower end of the lever 30, respectively, into the lower portion of the cam 31. With this arrangement the sensing pins will be drawn downwardly as soon as the cam 31 rotates to a position where the lower end of the cam lever 30 is cammed outwardly by the high portion of the cam 31. Shortly thereafter the cam roller 28 will move into and out of the low portion of the cam 31 under the influence of its spring 38 to move the pawl 33 downwardly and then as the roller 28 moves onto the high portion of the cam 31 to drive the pawl 33 upwardly and through the ratchet 35 drive a tape feed wheel 40 one step in a counterclockwise direction (FIGS. 1 and 3). As the tape feed wheel 40 rotates in a counterclockwise direction as shown in FIG. 1 a tape 42 will be advanced over a tape guide plate 43 and under a tape lid 44 to position a row of perforations in the tape in position to be sensed by the sensing pins 19.

The main power shaft 32 is suitably journalled for rotation in the framework (not shown) and serves to supply power to the movable parts of the apparatus. As shown in FIG. 3, the main power shaft has fixed to it a main driving gear 46 which meshes with and drives a setting rotor gear 47 and a restoring rotor gear 48. Gear 47 is fixed to a setting rotor shaft 49 and gear 48 is fixed to a restoring rotor shaft 50 which have fixed to them a plurality of setting rotors 51 and a plurality of restoring rotors 52, respectively.

In the embodiment of the invention illustrated herein it has been assumed that the permutation code, to be read from the tape 42 and transmitted, is a so-called five-unit start-stop code, that is, a code having five intelligence levels, a stop level and a start level. In the transmission of such telegraph codes the normal line condition, when no message is being transmitted, is a marking or current condition and the start pulse is invariably a spacing or no current pulse. Thus, it is necessary to first transmit a spacing (no current) pulse and then sequentially to transmit the five intelligence pulses which may permutatively be either marking or spacing and then to restore the telegraph line to the marking (current) condition. Consequently, the present apparatus is provided with six aligned setting rotors 51 that are all simultaneously moved into magnetically effective association with the five movable arms 15 and the fixed arm 16 to complete a magnetic circuit from the upper pole piece 12 through those of the movable arms that have been moved to association with the upper pole piece 12 and out of association with the secondary pole piece 14. The fixed arm 16 is always maintained in operative association with the upper pole piece 12 since it controls the stop pulse which is always marking.

Figure 2:
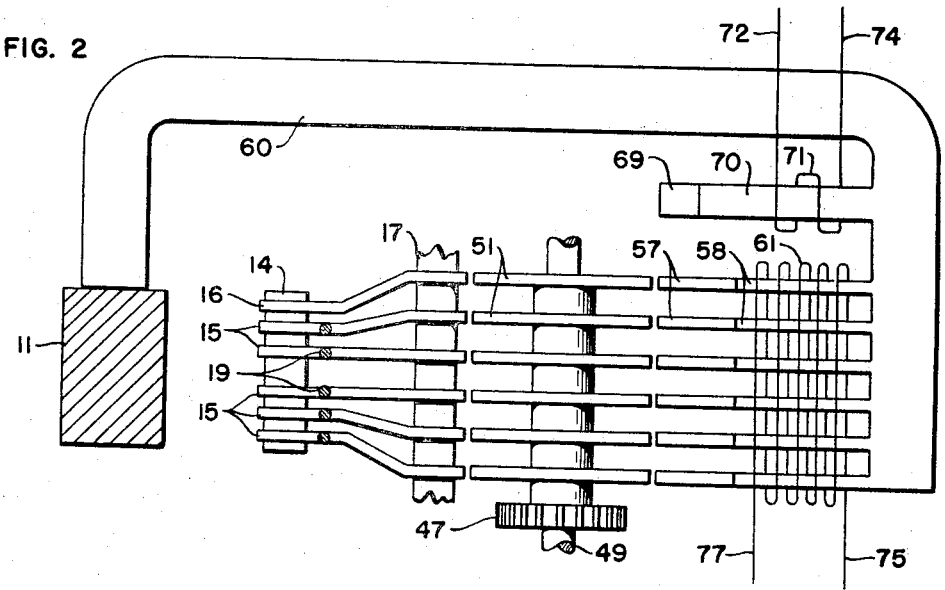
FIG. 2 is a plan sectional view taken substantially along the line 2—2 of FIG. 1 in the direction of the arrows showing the setting rotors and their operative association with the sensing pins, movable arms and the upper pole pieces of the memory cores.

The restoring rotor shaft 50 carries six of the restoring rotors 52 which are staggered in a spiral fashion around the shaft 50. Each of the six setting rotors 51 moves in a path that is aligned with a pole piece 57 of a memory core 58 individual to it and each memory core 58 has a lower pole piece 59 which is aligned with the associated restoring rotor 52 for completing a magnetic circuit from the lower pole piece 13 of the permanent magnet 11 through the rotors 52 sequentially to their associated memory core pole pieces 59. The memory cores 58 are mounted upon a magnetic return member 60 as most clearly shown in FIGS. 2 and 4 and a winding 61 is wound around all of the memory cores 58. As may be seen by reference to FIG. 2 the magnetic return member 60 is substantially U-shaped in construction and has its left-end attached to the permanent magnet 11 intermediate the poles of this magnet.

Figure 5:
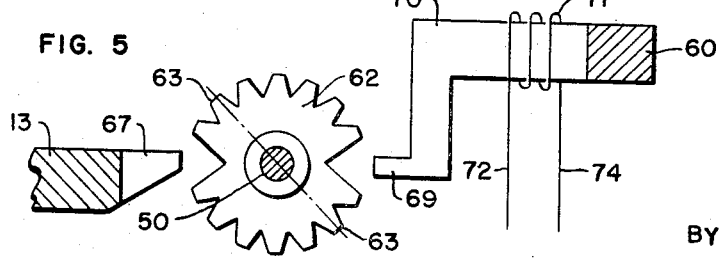
FIG. 5 is a vertical sectional view taken substantially along the line 5—5 of FIG. 4 in the direction of the arrows showing the details of construction of an auxiliary rotor which controls the pulsing of the auxiliary winding.

Also fixed to the restoring rotor shaft 50 is an auxiliary rotor 62 (FIGS. 4 and 5) which is provided with two sets of seven projections each. These projections form seven magnetic connectors 63. Aligned with the connectors 63 is an extension 67 of the lower pole piece 13 which is separated from the main portion of the pole piece 13 by a gap 68. Also aligned with the auxiliary rotor 62 is a pole 69 of a soft iron auxiliary core 70 which is mounted on the magnetic return member 60 and which has an auxiliary winding 71 on it. The magnetic connectors 63 thus complete the magnetic path between extension 67 and pole 69. One of the leads 72 from the auxiliary winding 71 extends to a flip-flop 73 and the other lead 74 from the auxiliary winding is connected to a lead 75, which in turn is connected to the winding 61 which surrounds the memory cores 58. A diode 76 is connected between the two leads 72 and 74 of the auxiliary winding 71 and a lead 77 from the winding 61 extends to the flip-flop 73.

OPERATION

The memory cores 58 are made of magnetic material, having the construction described hereinbefore, and are made of a material having a rectangular or square hysteresis loop. One core 58 is provided for each level of the tape, that is, there are five cores provided for the five intelligence levels and in addition there is provided one core 58 for the stop level of the five-level start-stop permutation code. No memory core is necessary for the start level of the code. In the drawings the setting rotors 51 associated with the cores 58 and with the movable arms 15 and fixed arm 16 are shown in the position where they are effective to set the memory cores 58. At this position of the shafts 49 and 50 the bail 22 will have released the sensing pins 19 and will have permitted them to move upwardly to detect the presence or absence of perforations in the tape 42, the feed wheel 40 having on the previous cycle presented a new row of possible perforations to the sensing pins 19. At the position of the shaft 49 and 50 shown in the drawings none of the restoring rotors 52 are in position to complete a magnetic path from the lower pole piece 13 to the lower pole piece 59 of the memory cores 58. However, just prior to moving to the position shown in the drawings, the auxiliary rotor 62 presented an aligned pair of magnetic connectors 63 to position in alignment with the extension 67 and the pole 69 of the auxiliary core 70 to cause the transmission of a spacing pulse through the flip-flop 73 prior to the time that the setting rotors 51 moved to a position to form a magnetic path from the arms 15 and 16 to their respective pole pieces 57 on the memory cores 58.

The operation of the apparatus will be more readily understood by reference to FIG. 6 which is a diagram of the magnetic circuit of one level of the transmitter. In this diagram the permanent magnet 11 is shown divided into an upper half 11–A and a lower half 11–B. A block R1 represents the magnetic reluctance of the shunt gap across the permanent magnet from the upper pole piece 12 to the secondary pole piece 14. In each case where reluctance is discussed herein, the reluctance of the soft iron parts forming the magnetic circuits is disregarded. The reluctance represented by the box R2 (FIG. 6) represents the reluctance in the gap from the pole piece 12 to the end of the arms 15 and 16. The reluctance represented by the box R3 is the reluctance in the gap from the auxiliary pole piece 14 to the end of the arms 15 and 16. The reluctance represented by the box R4 is the reluctance in the gaps between the arms 15 and 16 and their respective setting rotors 51 plus the reluctance between the setting rotors 51 and the pole pieces 57. The box R5 represents the reluctance in the gaps between the lower pole piece 13, restoring rotors 52 and their respective lower pole pieces 59. The box R6 represents the reluctance in the gaps between extension 67, connectors 63 and pole 69. The magnetic return member 60 is shown connected to the midpoint between the two halves 11–A and 11–B of the permanent magnet 11 and to the memory cores 58 and auxiliary core 70. It should be noted that only one level of the apparatus is illustrated in this magnetic circuit.

The apparatus, as illustrated in the drawings, is in the condition it assumes at the start interval, that is, the shafts 32, 49 and 50 have been rotated from their normal inoperative condition to a position where the sensing pins 19 have been released by the bail 22 and have moved up to sense the various levels of the tape 42 to detect the presence of perforations in the "selective levels" of the tape. The "selective levels" means those levels in which holes are present in the tape 42 for the character being sensed, there being five significant levels in the tape that are sensed by the pins 19 and there being six memory cores, one of which is assigned to the stop pulse or level. During the start pulse interval the setting rotors 51 will be aligned with the pole pieces 57 of all of the memory cores 58 and with the right ends of the arms 15. The rotation of the setting rotors 51 into the position in the drawing will cause the magnetization in the N–S direction of those memory cores 58 whose associated arms 15 are in their clockwise condition (selected condition). The term "N–S direction of magnetization" means that a core 58 as viewed in FIG. 1 is magnetized to assume the characteristics of a permanent magnet with the north pole at the left end and the south pole at the right end. Since the pin 16 is stationary and is always in its selected condition, the memory core 58 aligned with the arm 16 in the stop level also is magnetized in the N–S direction. This will cause the selected memory cores 58 to be set or magnetized in a magnetic circuit from the north pole of the permanent magnet 11 through the pole piece 12, selected arms 15 and arm 16, rotors 51, pole piece 57 of the selected memory cores 58 through the memory cores 58 and back through the magnetic return member 60 to the middle of the permanent magnet 11.

Those memory cores 58 associated with arms 15 which remain in their counterclockwise condition (unselected condition) continue to be magnetized in the S–N direction to which they previously were reset by the resetting operation of the rotors 52 as is more fully explained subsequently. These cores are the unselected cores as distinguished from the selected cores described in the preceding paragraph.

During this setting operation of the selected memory cores 58 the change in flux in the selected memory cores 58 will generate a voltage pulse in the winding 61. Since the arm 16 is always in a position to complete the N–S magnetic circuit to its memory core 58 there is bound to be a flux change in at least the memory core 58 assigned to the stop level. This change in magnetization of the memory core 58 in the stop level is sufficient to generate a useful voltage pulse in the winding 61. This voltage pulse will cause the flip-flop to be pulsed to change it from its idle marking condition to an operating condition. The additional flux change, which occurs simultaneuosly in the memory cores 58 of the levels selected by the pins 19 in cooperation with the arms 15, increases the magnitude of the voltage pulse in the winding 61 but does not alter the functioning of the apparatus.

As the shafts 32, 49 and 50 continue to rotate, the bail 22 will be retracted to withdraw the sensing pins 19 from contact with or penetration through the tape 42 and the setting rotors 51 will be rotated out of magnetic association with the arms 15 and 16 and the pole pieces 57. Continued rotation of the shaft 50 will move the first of the restoring rotors 52 to position to shorten or reduce the gaps between the pole piece 13, rotor 52 and lower pole piece 59 of the memory core 58. This will occur in what may be termed the No. 1 pulse interval. If the memory core 58 in the No. 1 level had been selected (magnetized in the N–S direction), by its associated arm 15, the restoring rotor 52 will, when effective, restore the memory core 58 in the No. 1 level to a magnetization in the S–N direction. If the No. 1 level had not been selected the memory core 58 for that level would not have been magnetized in the N–S direction and consequently would simply remain magnetized in the S–N direction. If the No. 1 level had been selected, and as a consequence thereof the restoring rotor 52 reverses the flux in the memory core 58 of the No. 1 level, a voltage pulse is generated in the winding 61. Thus, the signal winding 61 has a voltage pulse generated in it if a hole is present in the No. 1 level of the tape; otherwise essentially no change in flux occurs in the memory core 58 for the No. 1 level and consequently no voltage pulse is generated at the No. 1 interval. In this step of the operation, if a perforation was found in the No. 1 level, the magnetic circuit would be from the S pole of the permanent magnet 11 through the lower pole piece 13, No. 1 restoring rotor 52, pole piece 59 of memory core 58 in the No. 1 level and thence through the magnetic return member 60 back to the middle of the permanent magnet 11.

As the shafts 32, 49 and 50 continue to rotate, the tape 42 will be fed to the left by the action of the pawl 33 and sequentially the restoring rotors 52 will move to operative association with the lower pole piece 13 of the permanent magnet 11 and the lower pole pieces 59 of the memory cores 58 for the levels 2 through 5 and stop. Thus, as indicated in FIG. 1, the restoring rotor 52 in the sixth (stop) level has just passed the pole piece 59 and in so doing has pulsed the flip-flop 73 (FIG. 4) to put a marking condition on the line 80. The voltage pulses generated by the restoring rotors 52 in the winding 61 are fed through the flip-flop circuit 73 which converts them to a square wave start-stop signal of the required amplitude which is applied to an outgoing signal line 80. These voltage pulses in the winding 61 generate the transitions at the beginning of the start pulse, the selected code pulses and the stop pulse in what may be termed a space-to-mark transition of the signal line. They do not, however, generate a mark-to-space transition from the selected to the unselected code pulses, consequently a separate source of voltage pulses is required to throw the flip-flop 73 from a marking to a spacing condition. As considered herein a marking condition is a condition where current is supplied to the line and a space condition is a condition where no current is supplied to a signal line 80.

The generation of voltage pulses to effect a mark to space transition in the flip-flop 73 includes the auxiliary rotor 62, the extension 67 of the lower pole piece 13, the pole 69 of auxiliary core 70 and the winding 71 on the core 70. As the shaft 50 rotates, the auxiliary rotor 62 through its magnetic connectors 63 will cause the generation in the auxiliary winding 71 of a pair of pulses, one positive and one negative, generated as the flux rises and falls in the auxiliary core 70. The diode 76 shunted across the winding 71, suppresses one of these pulses generated in the winding 71 so that a resulting train of uni-directional pulses in the winding 71 occurs simultaneously with, has half the magnetization of, and opposes the pulses generated in the signal winding 61.

The resultant of the two series of pulses, that generated in the winding 71 by the auxiliary rotor 62 and that generated in winding 61 by restoring rotor 52 and selected core 58 is supplied to the flip-flop 73 which then generates the start-stop signals and applies them to the signal line 80 as will be more readily understood by reference to FIG. 6 wherein the magnetic action is illustrated for a selected level, i.e., a level in which a sensing pin 19 has detected a hole in the tape 42.

During the "setting" of the cores 58 reluctances R2 and R4 are very small while the reluctances R3 and R5 are large. With this condition prevailing, the setting rotor 51 in the selected level will form a magnetic circuit to cause the polarization of its memory core 58 in the N–S direction, simultaneously generating a pulse in the signal winding 61. After this setting operation, which occurs when the rotors are in the position shown in the drawing but before the restoring rotors 52 move to effective magnetic position, the reluctances R4 and R5 are large and roughly equal. This substantially removes the magnetomotive force from the magnetic core 58 but because of its square loop characteristic the memory core will remain polarized in the N–S direction with nearly the same flux density as it had when it was originally polarized in the N–S direction during the setting.

During the restoring operation, that is, when the restoring rotor 52 closes the gap between the lower pole piece 13 of the permanent magnet 11 and the lower pole piece 59 of the memory core 58, reluctance R4 is large while reluctance R5 is small. This will apply a sufficient opposing magnetomotive force to the memory core 58 to change its polarity from N–S to S–N. This change in flux generates a voltage pulse in the signal winding 61. The change in polarity from N–S to S–N, as just described, is substantially independent of the relationship between reluctances R2 and R3, since reluctance R4 is approximately an open circuit. Consequently, the sequential generation of voltage pulses in the winding 61 depends essentially on whether the respective memory cores 58 have been set to the N–S direction and is independent of whether the sensing pins 19 are held in their upper position. Thus, the retraction of the sensing pins 19 by the bail 22 may occur at any time after the setting operation. After the restoring rotors 52 have been sequentially rendered effective in the rotation of the shaft 50 but before the setting rotors 51 become effective for the succeeding selecting or setting operation reluctances R4 and R5 are large and roughly equal. The square loop characteristics of the cores will cause any of them to remain polarized in the direction S–N despite the virtually complete removal of magnetomotive force from them.

Although a particular embodiment of the invention is shown in the drawings and described in the foregoing specification, it will be understood that the invention is not limited to that specific embodiment, but is capable of modification and rearrangement, and substitution of parts and elements without departing from the scope of the invention.

What is claimed is:

1. A transmitter for applying signals to a signal line comprising:
   a plurality of sensing members permutatively positioned to at least two positions in accordance with the permutations of the signal to be transmitted;
   a magnetic control device individual to and operated by each sensing member positioned to a predetermined one of the positions;
   a memory core having primary and secondary stable states for each control device and selectively operable by its control device;
   means for simultaneously and momentarily establishing magnetic paths from the operated ones of the control devices to those memory cores associated with the operated control devices to drive those cores from the primary stable state to the secondary stable state;
   means operated after the breaking of said paths for sequentially completing magnetic circuits to drive all the cores that had been driven to the secondary stable state back to the primary stable state;
   an output winding on said cores in which a pulse of a given sense is generated upon a core being driven from the secondary stable state to the primary stable state to control the application of signals to said signal line;
   an auxiliary source of pulses of an opposite sense; and
   a signal generating flip-flop connected to said winding and to said auxiliary source for actuation thereby to generate and apply signals to the signal line in a sequence of pulses representing the permutation code of the signal to be transmitted.

2. A transmitter for applying signals to a signal line comprising:
   a plurality of sensing members permutatively positioned in accordance with the permutations of the signal to be transmitted;
   a permanent magnet structure including a permanent magnet, a setting pole piece at one end of said permanent magnet, a restoring pole piece at the other end of said permanent magnet, and a magnetic return member having one end connected to said permanent magnet intermediate the ends of said permanent magnet and having its other end positioned in spaced relation to said permanent magnet;
   a plurality of memory cores, settable to either a primary stable state or a secondary stable state, connected to said other end of the return member;
   a plurality of setting rotors, one individual to each memory core;
   means set by said sensing members to prepare magnetic circuits from the setting pole piece through the sensing members, setting rotors, memory cores, and return member;
   means for rotating said setting rotor in position to complete the magnetic circuits that have been prepared to drive selected ones of the memory cores from their primary stable state to their secondary stable state;
   a plurality of restoring rotors, one individual to each memory core for completing magnetic circuits from the restoring pole piece through the restoring rotors, the memory cores, and return member to restore the memory cores from their secondary stable state to their primary stable state;
   means for driving the restoring rotors to cause the restoring rotors to restore the driven cores to their primary stable state; and
   means operated by the memory cores in returning to their primary stable state to apply signals to the signal line.

3. A transmitter for applying permutation-coded signals to a signal line comprising:
   a plurality of sensing members permutatively positioned to predetermined positions in accordance with the permutations of a signal to be transmitted;
   a magnetic control device individual to and operated by each sensing member attaining one of the predetermined positions;
   a memory core having primary and secondary stable states for each control device and selectively operable by its control device;
   means for simultaneously and momentarily establishing magnetic paths from the operated ones of the control devices to those memory cores associated with the operated control devices to drive those cores from the primary stable state to the secondary stable state;
   means operated after the breaking of said paths to sequentially complete magnetic circuits to drive all the cores that had been driven to their secondary stable state back to their primary stable state;
   an output winding on said cores in which a pulse is generated upon a core being driven from the secondary stable state to the primary stable state to control the application of signals of a given sense to said signal line; and
   means for generating a pulse to control the application of signals of a different sense to said signal line when the means for completing the magnetic circuits causes no transition from the secondary stable state to the primary stable state in its sequence of circuit completions.

4. A transmitter for applying signals to a signal line comprising:
   a plurality of members settable to represent a code combination in a plurality of intelligence levels;
   a memory core assigned to each intelligence level and selectively driven individually from a primary stable state to a secondary stable state in accordance with the code combination;
   an output winding on said cores;

means for driving selected ones of said cores to their secondary stable states as permutatively selected by said settable members;

means for sequentially resetting said cores to generate a pulse in said winding;

an auxiliary core member of low remanence material;

an auxiliary winding on said auxiliary core;

means for passing a pulsating flux through said auxiliary core to generate voltage pulses in said auxiliary winding;

a flip-flop circuit for applying a telegraph signal to the telegraph line; and means interconnecting the winding on the memory cores and the winding on the auxiliary core to the flip-flop for controlling the operation of the flip-flop.

5. A transmitter for applying permutation-coded signals to a signal line comprising:

a plurality of sensing members permutatively positioned in accordance with permutations of a signal to be transmitted;

a permanent magnet structure including a permanent magnet, a setting pole piece at one end of said permanent magnet, a restoring pole piece at the other end of said permanent magnet, and a magnetic return member having one end connected to said permanent magnet intermediate the ends of said permanent magnet and having its other end positioned in spaced relation to said permanent magnet;

a plurality of memory cores, settable to either a primary stable state or a secondary stable state, connected to said other end of the return member;

a plurality of setting rotors, one individual to each memory core;

means set by said sensing members to prepare magnetic circuits from the setting pole piece through the set sensing members, setting rotors, memory cores, and return member;

means for rotating said setting rotors to position to complete the magnetic circuits that have been prepared to drive selected ones of the memory cores from their primary stable state to their secondary stable state;

a plurality of restoring rotors, one individual to each memory core for sequentially completing magnetic circuits from the restoring pole piece through the restoring rotors, the memory cores, and return member to restore the memory coes from their secondary stable state to their primary stable state;

means for driving the restoring rotors to cause the restoring rotors to restore the driven cores to their primary stable state one at a time;

an output winding on the memory cores in which a pulse is generated each time a core is driven from the secondary stable state to the primary stable state;

an auxiliary core member of low remanence material connected to the other end of the return member;

an auxiliary rotor driven with the restoring rotor for completing a magnetic circuit to pulse said auxiliary core member each time a magnetic circuit is completed, by the restoring rotors, to a memory core;

an output winding on the auxiliary core in which is generated a pulse of lesser magnetiude than the pulses generated in the output winding on the memory cores; and a flip-flop connected to the output winding on the memory cores and the output winding on the auxiliary core for applying signals to the signal line whereby the sense of the signal on the signal line is controlled by the coincidence or lack of coincidence of pulses in the two windings.

6. A transmitter for applying signals to a signal line comprising:

a plurality of members permutatively positioned to first or second predetermined positions, in a predetermined number of levels, in accordance with a signal code;

a magnetic control device individual to and operated by each member in a first position;

a memory core having primary and secondary stable states for each level and selectively operable by its control device;

means for simultaneously and momentarily establishing magnetic paths from the operated ones of the control devices to those memory cores associated with the operated control device to drive these cores from the primary stable state to the secondary stable state;

means operated after the breaking of said paths for sequentially completing magnetic circuits to drive all the cores that had been driven to the secondary stable state back to the primary stable state;

an output winding on said cores in which a pulse of a given sense is generated upon a core being driven from the secondary stable state to the primary stable state to control the application of signals to said signal line;

an auxiliary source of pulses of an opposite sense; and a signal generating flip-flop connected to said winding and to said auxiliary source for actuation thereby to generate and apply signals to the signal line in a sequence of pulses representing the signal code as controlled by the sense of the pulses received from the winding and auxiliary source.

7. Apparatus for applying permutation-coded signals to a signal line including:

a plurality of magnetic control devices permutatively operated from a first to a second condition in accordance with the permutation-coded signal to be transmitted;

a magnetic memory core having two stable magnetic states individual to and selectively controlled by each control device;

means for establishing, from each control device that has been operated to the second condition, a magnetic path to the memory cores individual to those control devices to drive those memory cores from one stable magnetic state to another stable magnetic state;

means for sequentially completing magnetic circuits to drive all of the memory cores from the other stable magnetic state to said one stable magnetic state, causing those cores that were driven to the other stable state to be driven sequentially back to said one stable state; and means responsive to the driving back of a core to said one stable state from said other stable state for controlling the application of signals to the signal line.

8. A switching device including:

a magnetic control device operated to first or second conditions;

a memory core having a primary stable state and a secondary stable state, said core being operated by the control device; and means for establishing, from the control device whenever it has been operated to the first condition, a magnetic path to the memory core to drive the core to the secondary stable state.

9. A switching device according to claim 8 wherein a non-magnetic gap exists in the magnetic path from the control device to the memory core and wherein the path establishing means is a magnetic element which bridges said gap to establish said magnetic path.

10. A switching device according to claim 8 wherein the magnetic control device is an oscillatable arm of magnetic material moveable to at least first and second positions, said magnetic bridging element being effective to drive the core to the secondary stable state whenever the control arm is in said first position at the time the bridging element bridges the non-magnetic gap.

11. A switching device according to claim 10 wherein a second magnetic path is established through the magnetic bridging element from the magnetic control arm to the memory core to drive the core to the primary stable state whenever the control arm is in said second position.

12. A switching device according to claim 8 further including additional means for establishing a second magnetic path to drive the core from its secondary stable state to the primary stable state, causing the core to be returned to the primary stable state.

References Cited

UNITED STATES PATENTS

| | | | |
|---|---|---|---|
| 2,727,091 | 12/1955 | Zenner | 178—17 |
| 2,814,031 | 11/1957 | Davis | 340—174 |
| 2,915,243 | 12/1959 | La Pointe | 235—61.11 |
| 3,045,903 | 7/1962 | Fleming | 235—61 |

THOMAS A. ROBINSON, *Primary Examiner.*